US008504556B1

(12) United States Patent
Rice et al.

(10) Patent No.: US 8,504,556 B1
(45) Date of Patent: Aug. 6, 2013

(54) SYSTEM AND METHOD FOR DIMINISHING WORKLOAD IMBALANCE ACROSS MULTIPLE DATABASE SYSTEMS

(75) Inventors: Charles E. Rice, Bainbridge Island, WA (US); Adam D. Morley, Seattle, WA (US); Michael D. Leonhard, Seattle, WA (US); Glenn A. Dierkes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 250 days.

(21) Appl. No.: 12/719,828

(22) Filed: Mar. 8, 2010

(51) Int. Cl.
*G06F 17/30* (2006.01)

(52) U.S. Cl.
USPC ............ 707/713; 707/719; 707/720; 707/770

(58) Field of Classification Search
USPC .................................. 707/713, 719, 720, 770
See application file for complete search history.

(56) References Cited

U.S. PATENT DOCUMENTS

| 5,799,173 | A | 8/1998 | Gossler et al. |
| 6,173,306 | B1 | 1/2001 | Raz et al. |
| 6,523,036 | B1 * | 2/2003 | Hickman et al. ............ 707/704 |
| 7,992,152 | B2 * | 8/2011 | Hashimoto et al. ........... 718/105 |
| 2004/0267930 | A1 | 12/2004 | Giulio et al. |
| 2005/0267929 | A1 | 12/2005 | Kitamura |
| 2006/0136448 | A1 * | 6/2006 | Cialini et al. ................. 707/101 |
| 2007/0203910 | A1 * | 8/2007 | Ferguson et al. ................ 707/8 |
| 2008/0225714 | A1 * | 9/2008 | Denis ............................ 370/232 |
| 2009/0100180 | A1 * | 4/2009 | Chidambaran et al. ........ 709/226 |

OTHER PUBLICATIONS

Steven S. Seiden, et al., "New bounds for Variable-Sized Online Bin Packing," SIAM J. Comput. vol. 32, No. 2, pp. 455-469, 2003 Society for Industrial and Applied Mathematics.

* cited by examiner

*Primary Examiner* — Khanh Pham
(74) *Attorney, Agent, or Firm* — Robert C. Kowert; Meyertons, Hood, Kivlin, Kowert & Goetzel, P.C.

(57) ABSTRACT

Various embodiments of a system and method for diminishing workload imbalance across multiple database systems are described. Embodiments may include a resource balancer configured to, for each of a multiple database systems hosting database resources assigned to different user entities, generate a system usage score for that database system based on database usage scores of respective database resources hosted by that database system. Each usage score of a given database resource may indicate a quantity of work performed by the respective database system to process one or more requests directed to that database resource. The resource balancer may also be configured to generate one or more instructions to move a database resource from a first database system having a first system usage score to a second database system having a smaller system usage score in order to diminish an imbalance of workload across the database systems.

36 Claims, 6 Drawing Sheets

SYSTEM AND METHOD FOR DIMINISHING WORKLOAD IMBALANCE ACROSS MULTIPLE DATABASE SYSTEMS

BACKGROUND

Cloud computing represents a paradigm shift in the way computing resources are delivered and consumed. In cloud computing, service providers may operate a "cloud" of network-accessible resources, such as network-accessible software applications, services (e.g., web services), storage (e.g., raw data storage or structured data storage), and computational resources (e.g., processor cycles). These resources may be offered to cloud consumers under a variety of commercial arrangements. In many cases, such arrangements may prove to be an economically viable solution to the technology needs of consumers. For instance, one example may include a "pay as you go" arrangement where consumers have the option to pay for only the cloud resources they consume. These arrangements may be particularly attractive to consumers that have temporary computing resource needs or to consumers that do not want to invest in on-site infrastructure. Various other characteristics make cloud computing an attractive solution to many consumers. For instance, when time is of the essence, cloud computing can quickly provide consumers with the necessary computing resources in an on-demand fashion, which relieves the consumer of longer lead times associated with installation and configuration of physical infrastructure. When selecting a service provider, consumers often consider the price at which different service providers offer a given level of service. One way in which a service provider can provide a competitive advantage over other service providers in the marketplace is by efficiently utilizing existing infrastructure in order to provide consumers with lower prices.

While the system and method for diminishing workload imbalance across multiple database systems is described herein by way of example for several embodiments and illustrative drawings, those skilled in the art will recognize that the system and method for diminishing workload imbalance across multiple database systems is not limited to the embodiments or drawings described. It should be understood, that the drawings and detailed description thereto are not intended to limit the system and method for diminishing workload imbalance across multiple database systems to the particular form disclosed, but on the contrary, the intention is to cover all modifications, equivalents and alternatives falling within the spirit and scope of the system and method for diminishing workload imbalance across multiple database systems as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
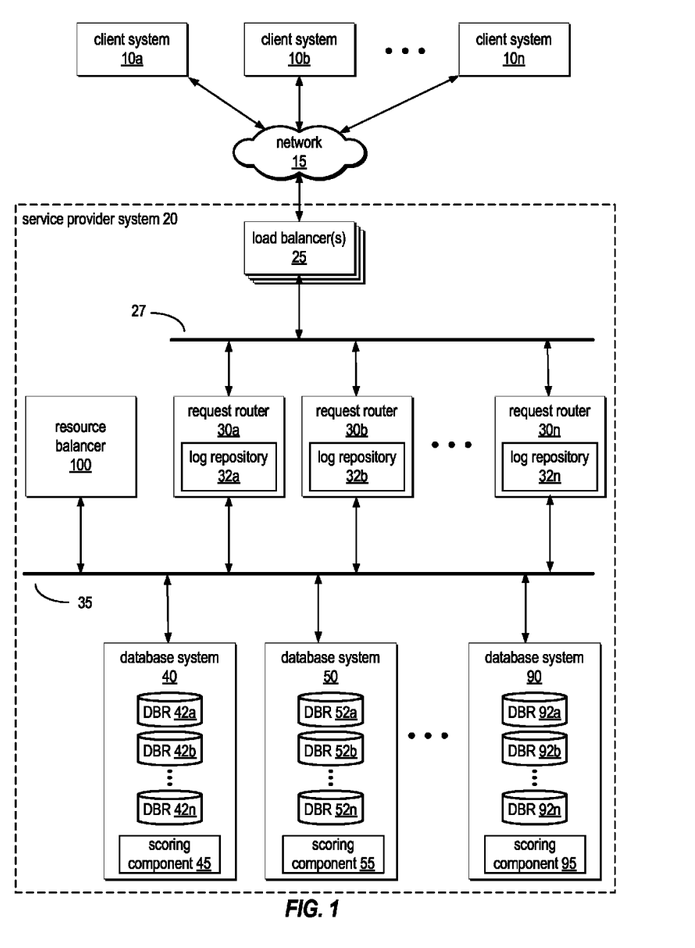
FIG. 1 illustrates a block diagram of an example system configuration including a resource balancer, according to some embodiments.

Various embodiments of a system and method for diminishing workload imbalance across multiple database systems are described. Embodiments may include a resource balancer configured to utilize various techniques to diminish workload imbalance among multiple database systems in a multi-tenant database environment. FIG. 1 illustrates a block diagram of a resource balancer implemented within such an environment. In the illustrated embodiment, any quantity of client systems 10*a-n* may submit database requests to access database resources hosted by the illustrated database systems. In various embodiments, these client systems may be controlled by different user entities. Examples of user entities include individuals or business entities. In some cases, a user entity may be a customer or consumer of database resources provided by a service provider that operates service provider system 20.

Client requests (e.g., requests originating from client systems 10*a-n*) may be routed through network 15, which may include one or more Local Area Networks (LANs) (e.g., an Ethernet or corporate network), Wide Area Networks (WANs) (e.g., the Internet), wireless data networks, other electronic data networks, or some combination thereof. In one non-limiting example, network 15 is the Internet. Different types of client requests are described in more detail below, but may generally include any type of request to access a database resource (e.g., read, write, query, etc.).

Client requests may be directed to one or more load balancer(s) 25, which may be responsible for distributing requests to different request routers 30*a-n*. In various embodiments, load balancer(s) 25 may serve as an entry point for a network-based service (e.g., a web service providing database functionality) provided by service provider system 20. In some cases, this entry point may be addressed by a Uniform Resource Locator (URL) or other identifier to which requests may be directed. Load balancer(s) 25 may be physically and/or communicatively coupled to request routers 30*a*-30*n* via network 27, which may include one or more LANs, WANs, wireless data networks, other electronic data networks, or some combination thereof. In various embodiments, load balancer(s) 25 may seek to evenly distribute client requests among request routers 30*a*-30*n*. In one example, load balancer(s) 25 may distribute requests to request routers 30*a*-30*n* in a round robin fashion. In another example, load balancer(s) 25 may monitor the processing load on each request router 30*a*-30*n* and send a client request to the least-loaded request router. The load balancer(s) 25 may utilize different techniques for distributing requests in other embodiments.

Request routers 30*a*-30*n* may include computer systems configured to evaluate client requests in order to determine to which database system a request is to be routed. In one non-limiting example, request routers 30*a*-30*n* may be web servers tasked with evaluating client requests and routing such requests to the appropriate database system. For instance, a client request may identify a particular database resource to which the request is directed; the request router may be configured to route the request to a database system hosting that database resource. Request routers 30a-30n may be physically and/or communicatively coupled to the illustrated database systems (e.g., database systems 40, 50 and 90) via network 35, which may include one or more LANs, WANs, wireless data networks, other electronic data networks, or some combination thereof. Requests sent from request routers 30a-30n may be sent to the illustrated database systems over network 35.

The illustrated database systems (e.g., database systems 40, 50 and 90) may be configured to process a client request by performing one or more tasks with respect to a database resource, such as reading data from the appropriate database resource, writing data to the appropriate database resource, or querying the appropriate database resource. In the illustrated embodiment, database system 40 includes multiple database resources (each denoted as "DBR") 42a-42n. Likewise, database system 50 and database system 90 include database resources 52a-52n and database resources 92a-92n, respectively. In various embodiments, each database system may be a separate computer system (e.g., a computer system similar to that of FIG. 6). Database systems may store respective database resources within memory (e.g., on disk, RAM, or other computer-accessible storage medium). While the illustrated embodiment illustrates three database systems, various embodiments may include any quantity of databases systems. In one non-limiting example, some embodiments may include over 1,000 databases systems, some of which may be positioned in disparate geographic locations (e.g., within geographically dispersed data centers).

Generally, each database resource may be associated with a particular user entity. Moreover, each user entity may be associated with multiple database resources. In various embodiments, each database system is configured to restrict access of a particular database resource to the user entity that is associated with that database resource. In various embodiments, each illustrated database resource may be some defined data set stored within memory of the respective database system. In one example, a database resource may be a defined set of tables that make up a relational database. In another example, a database resource may be a set of data associated together by common metadata (e.g., a common identifier). For example, database resources may be identified by a user entity identifier (e.g., a customer identifier) and a database identifier (e.g., an identifier to differentiate among database resources of the same user entity).

Note that different database resources may exert different magnitudes of workload on the database systems. For instance, one database resource may be the target of 1,000 client requests per hour whereas another database resource may be the target of only two client requests per hour. In various embodiments, each database system may include a respective scoring component (e.g., scoring components 45, 55 and 90) configured to assign an operation usage score to each request processed by the scoring component's respective database system. Different requests may result in different usage scores assigned by a scoring component. Generally, the greater the quantity of work performed by a database system to process a request, the greater the usage score assigned by the scoring component. In addition to operation usage scores that correspond to individual requests, various embodiments may also include a component (e.g., resource balancer 100) configured to generate database usage scores for each database resource as well as system usage scores for each database system. This scoring process is described in more detail below with respect to FIG. 3.

After a database system processes a request and the scoring log assigns an operation usage score to the request, the database system may send a response message to the request router (e.g., the request router from which the database system received the corresponding request). The response message may include the response to the request as well as the operation usage score for the request. The response portion of the response message may depend on the requested operation. For instance, if a request specifies that a read operation is to be performed to read a particular record of a particular database resource, the response message may include data read from that record. In another example, if a request specifies that a write operation is to write specific data to a record of the database resource, the response message may include an acknowledge message to indicate that the write was performed successfully. In yet another example, if a request specifies a query, the response message may include results of the query (e.g., one or more database records matching the query). Note that the operation usage scores assigned to a request may vary depending on the type of request (e.g., read, write, query, etc.). Additionally, usage scores may vary among requests of the same type. For instance, a query that requires the database system to evaluate 1000 records of a database resource may be assigned a larger operation usage score than a query that requires the database system to evaluate only 10 records of a database resource.

When a request router receives a response message, the request router may store a log of the usage score and any relevant metadata (e.g., database resource identifier, timestamp indicating when request was processed, user entity identifier, database system identifier, etc.) from the response message into a log repository, such as log repositories 32a-32n stored in memory of request routers 30a-30n. After multiple requests have been processed, each log repository may include log records for any of the database resources hosted by the various database systems.

As described in more detail below with respect to FIG. 3, resource balancer 100 may be configured to determine, for each database system, the quantity of work that the database system has performed during a particular time period (e.g., during the past week, day, hour, minute, etc.). In many cases, some database systems may have performed a relatively large quantity of work relative to other database systems. In some cases, the performance of a database system (e.g., its ability to efficiently process database requests) may be diminished when burdened with a high work load, which may ultimately result in a less-than-desirable service quality for user entities (e.g., database service customers). Resource balancer 100 may diminish the workload imbalance across the various database systems by selectively moving database resources from high workload database systems to low workload database systems; this process may be referred to herein as resource balancing.

As described above, for each request received by a database system, a scoring component of that database may assign a usage score to that request. The scoring components described herein (e.g., scoring components 45, 55 and 95) may be configured to utilize a usage scoring model to assign a usage score to a given request. Different usage scoring models may be utilized for different requests. The configuration and application of such a usage model is described below with respect to a read request; similar techniques may be applied to other types of requests (e.g., write requests, queries, etc.).

In regard to an example read request, a given database system (e.g., database system 40) may be tested to determine the maximum throughput of read requests for a given time period. In one non-limiting example, a given database system may be capable of processing 13 single-attribute read requests per second (which may be denoted as 13 requests/ second). From the maximum throughput value, a usage score can be calculated that represents a fraction or percentage of a database system's hourly processing capability for that particular type of read request. For instance, by inverting the throughput value of 13 requests/second, it can be demonstrated that the given database system requires 1/13th of a second in order to process this particular type of read request (~0.0769 seconds/request). By dividing by 3600 seconds, this value can be translated into a usage score of ~0.000021368 hours/request (because there are 3600 seconds in one hour). In other words, in this non-limiting example, 0.000021368 hours of database system usage may be the quantity of work that a database system performs to process a read request for a single attribute.

Note that some read requests may be more computationally intensive than other read requests because the quantity of attributes that are read may vary. For instance, a request to read a single specific attribute of an item (or "record") may be less computationally intensive than reading multiple (e.g., all) attributes of that item. By testing a database system to determine the maximum throughput of read requests for different quantities of attributes, a mathematical model may be created to estimate or project the quantity of work required to perform a read request of any given attribute length. In one non-limiting example, a quadratic model (or other polynomial model) may be utilized to generate a usage score for a read request. An example of this model may conform to equation 1 below.

$$\text{operation usage score}_{read} = A + Bx^2 \qquad \text{eq. (1)}$$

Equation 1 represents one example of a quadratic model for determining an operation usage score for a read request. In this example, A is a constant, which may be proportionate to the minimum quantity of work (e.g., overhead) required to perform any read request irrespective of the quantity of attributes read. Additionally, x may be a variable which represents the quantity of attributes read; constant B may be a scaling factor (e.g., a per-attribute constant). In various embodiments, similar techniques may be utilized to model write requests and query requests, although different constants and/or equations may be utilized in some cases. For instance, to model query requests, a variable that represents the quantity of records (e.g., database rows) evaluated to fulfill the query may be used in the equation. In general, any equation or curve-fitting technique (e.g., regression analysis) may be utilized to model usage scores in various embodiments. Furthermore, it should be understood that embodiments are not limited to quadratic models; the quadratic model described above is one example of a variety of polynomial models that may be utilized in various embodiments. For instance, other polynomial models may be utilized for write requests, queries, and other database operations, as described in more detail below.

Another example of a polynomial model may conform to equation 2 below.

$$\text{operation usage score}_{write} = A + Bx^3 \qquad \text{eq. (2)}$$

Equation 2 represents an example of a polynomial model for determining an operation usage score for a write request. In this example, A is a constant, which may be proportionate to the minimum quantity of work required to perform any write request irrespective of the quantity of attributes written. Additionally, x may be a variable which represents the quantity of attributes written; constant B may be a scaling factor (e.g., a per-attribute constant).

An additional example of a polynomial model may conform to equation 3 below.

$$\text{operation usage score}_{query} = A + Bx \qquad \text{eq. (3)}$$

Equation 3 represents an example of a polynomial model for determining an operation usage score for a database query. In this example, A is a constant, which may be proportionate to the minimum quantity of work required to perform a query irrespective of the quantity of rows (or records) examined to complete the query. Additionally, x may be a variable which represents the quantity of rows (or records) examined to complete the query; constant B may be a scaling factor.

Another example of a polynomial model may conform to equation 4 below.

$$\text{operation usage score}_{batchput} = (y) \times (A + Bx^3) \times (d) \qquad \text{eq. (4)}$$

Equation 4 represents an example of a polynomial model for determining an operation usage score for a batch put operation. The batch put operation may be utilized to write multiple attribute values (for one or more items) in a single call. Utilizing the batch put operation (in lieu of individual put operations) may yield savings in round trip communication and associated latencies. In this example, A is a per-request constant. Additionally, x may be a variable which represents the number of attributes written in the request; B may be a per-attribute constant. Additionally, y may represent the quantity of individual put requests. The d value may represent a discount value that reduces the operation usage score to encourage use of the batch put operation over individual put operations.

In various embodiments, the usage models described herein may include variables other than an attribute quantity. For example, a read request to read an item with a small data footprint may be less computationally expensive than a read request to read an item with a larger data footprint. In this example, the models described herein could be modified to include a variable for data size. Other modifications are possible and contemplated.

In some cases, the models described herein may be formulated by the service provider (e.g., through testing and analysis of system developers). In other cases, such testing and analysis may be performed by logic (software and/or hardware) of one or more components of service provider system 20. Irrespective of how the usage models are formulated, the scoring components described herein (e.g., scoring components 45, 55 and 90) may be configured to utilize such usage models to assign operation usage scores to requests processed by respective database systems. Note that while the scoring components of FIG. 1 are illustrated as components of the database systems, such scoring components may be implemented as components of other system elements (e.g., resource balancer 100, request routers 30a-30c) in some embodiments.

Figure 2:
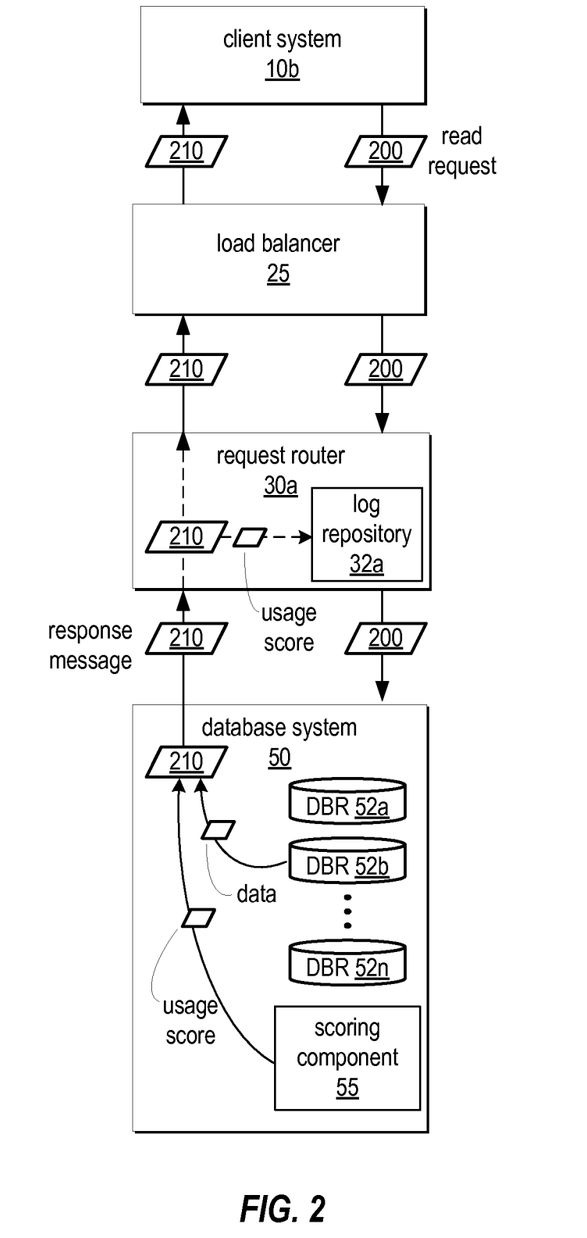
FIG. 2 illustrates a flow diagram of the processing of a request and the collection of log data, according to some embodiments.

FIG. 2 illustrates a flow diagram of the processing of a read request. Note that for purposes of clarity FIG. 2 illustrates the processing of only one request. It should be understood that similar processes may be repeated multiple times for various types of database requests processed by service provider system 20. Also note that for clarity of illustration, various client systems and elements of service provider system 20 are not illustrated. It should be understood that the illustrated embodiment of FIG. 2 may operate within the context of the system described with respect to FIG. 1.

In the illustrated embodiment, client system 10b issues a read request 200, which is sent over a network to load balancer 25. In various embodiments, one or more processes executing on client system 10b may generate and transmit such a request. Load balancer 25 forwards this request to a request router, which is request router 30a in the illustrated embodiment. The load balancer may select request router 30a utilizing any of the techniques described above with respect to FIG. 1. Request router 30a may examine request 200a to determine to which database system the request should be routed (e.g., database system 50). In various embodiments, request 200 may specify a particular database resource (e.g., as indicated by a database identifier) to which the request is directed. The request router may also include (or have access to) information that specifies the particular database resources that are currently hosted by each of the database systems of service provider system 20; such information may be referred to herein as a database resource-database system mapping. Request router 30a may perform a lookup operation on such mapping to determine which database system corresponds to that database resource.

In some embodiments, different database resources may be replicated on different database systems for purposes of data durability. For instance, in many cases, database resources may be replicated across database systems located in different data centers (or other facilities) that are geographically dispersed. In these embodiments, the mapping described above may include a mapping of database resources to respective replicas. In one non-limiting example, each database resource may have two other replicas for a total of three instances of the same database resource.

Upon selecting the appropriate database system, the request router may transmit the request. In the illustrated embodiment, this is illustrated as request router 30a providing database system 50 with request 200. Database system 50 may be configured to process the read request. For instance, the read request may specify database resource 52b, a particular record of that database resource (e.g., a row in the database), and one or more attributes of that record (e.g., data located at one or more column positions in the row). Database system 50 may be configured to retrieve the appropriate attributes in accordance with the read request and incorporate the attributes into a response message 210. Note that for other requests, the response message may include different types of information or data. For instance, in the case of a write request, the response message may instead include an acknowledgement to indicate a successful write. In the case of query requests, the response message may include the query results.

In addition to the request results, the response message may also include the usage score for the request. This usage score may be generated by the scoring component of the database system, which is scoring component 55 in this case. Scoring component 55 may utilize the usage score models described above to generate an operation usage score for the request. For instance, scoring component 55 may be configured to generate an operation usage score for the read request in accordance with equation 1 (where x is equivalent to the quantity of attributes read from database resource 52b). The database system may incorporate the generated operation usage score into response message 210 and return the response message to request router 30. In some embodiments, response data and usage scores may be sent in separate messages.

Request router 30a may be configured to extract the usage score from the response message (e.g., via a move or copy operation) and store the usage score into log repository 32a.

In various embodiments, the usage score may include various metadata, such as a user entity identifier of the requestor (e.g., a customer identifier), an identifier of the database resource accessed (e.g., database resource 52b), an identifier of the database system accessed (e.g., database system 50), and a timestamp specifying a temporal indication of when the request was processed by that database system. This metadata may be utilized by the resource balancer for aggregating and analyzing the log data from multiple request routers, as described in more detail below with respect to the operation of the resource balancer (FIG. 3).

In addition to extracting the usage score and any metadata from response message 210, request router 30a may provide the response message to load balancer 25, which may return the response to client system 10b. In some embodiments, the request router may bypass the load balancer and provide the response message directly to client system 10b.

The process illustrated in FIG. 2 may be repeated for multiple requests originating from various client systems and directed to different database resources. After multiple requests have been processed, log repositories 32a-32n may include multiple usage scores and associated metadata. This information may be utilized by resource balancer 100 in order to diminish a workload imbalance across multiple database systems in service provider system 20, as described in more detail below.

Figure 3:
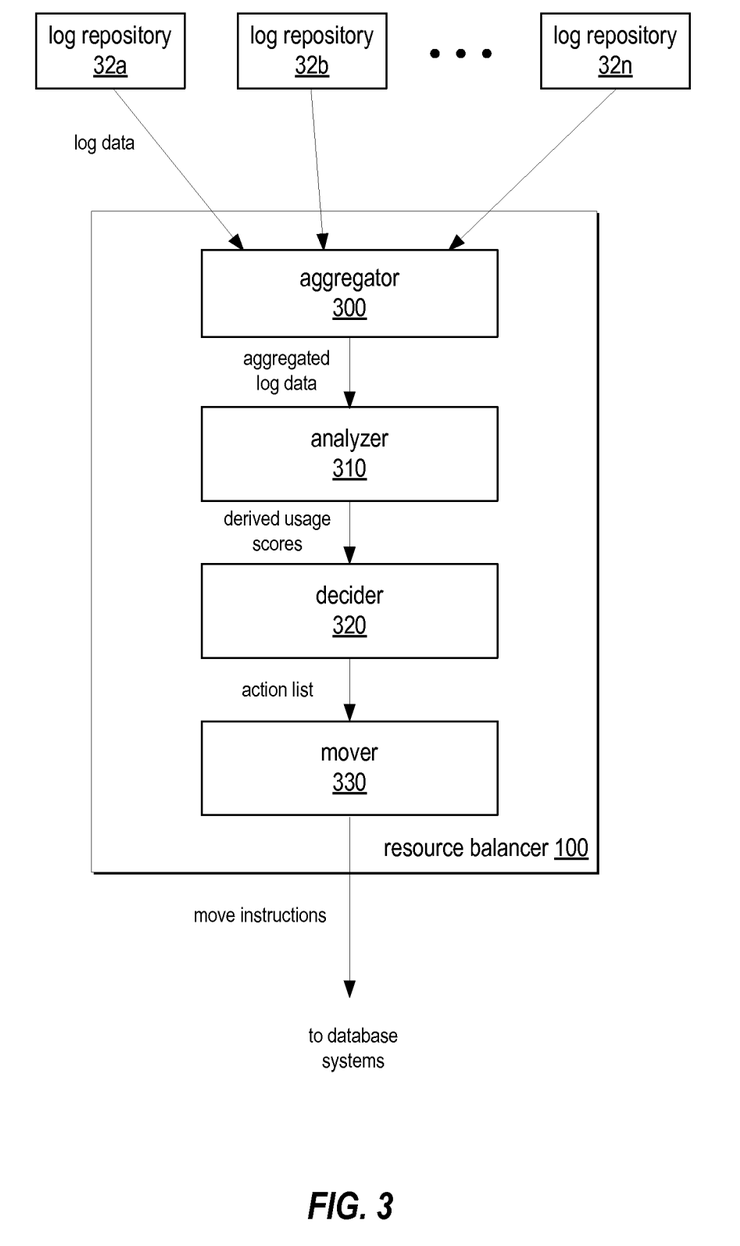
FIG. 3 illustrates a block diagram of resource balancer components and the generation of instructions to move database resources, according to some embodiments.

FIG. 3 illustrates a flow diagram of the operation of resource balancer 100, according to various embodiments. Note that in various embodiments resource balancer 100 may be implemented on a single computer system (e.g., the computer system of FIG. 6) or on multiple computer systems (e.g., in a distributed manner). In some cases, embodiments may include multiple resources balancers configured to operate in parallel. Also note that each of the resource balancer's components (e.g., aggregator 300, analyzer 310, decider 320 and mover 330) may be implemented by the same executable program module or by separate executable program modules. In some embodiments, some of the illustrated components may be implemented by the same program module while other components are implemented by separate program modules. For instance, in one embodiment, analyzer 310 and decider 320 may be implemented by the same program module while aggregator 300 and mover 330 are implemented by different program modules. Various other combinations are possible and contemplated.

In some embodiments, resource balancer 100 may include an aggregator component 300 configured to retrieve log data from the various log repositories 32a-32n of service provider system 20. In some cases, aggregator 300 may poll the log repositories for log data from specific time periods (e.g., the past day or hour). In other cases, aggregator 300 may collect all available log data. The log data may include operation usage scores and associated metadata as described above.

As illustrated, aggregator 300 may provide the aggregated log data to analyzer component 310. Analyzer component 310 may be configured to generate additional usage scores (e.g., at the database resource and/or database system level). Based on the operation usage scores of the log data (e.g., the usage scores previously generated on a per request basis), the analyzer component may be configured to generate a usage score for each database resource (e.g., DBRs 42a-42n, DBRs 52a-52n, DBRs 92a-92n), which may be referred to as a database usage score. In various embodiments, analyzer 310 may generate a database usage score for a respective database resource by summing the individual usage scores corresponding to client requests directed to that database resource. For example, analyzer 300 may evaluate usage scores and associated metadata to collect all operation usage scores associated with requests directed to DBR 52*b* within the past 24 hours. To determine a corresponding database usage score for DBR 52*b*, the analyzer component may sum the collected usage scores; the database usage score may be the result of that summation. This process may be repeated for all database resources of service provider system 20. In various embodiments, a database usage score of a particular database resource may represent the quantity of work performed by the respective database system to host that database resource. Generally, the more requests directed to that database resource, the larger the database usage score will be for that database resource. (Note that this may not be true in all cases because some types of requests are more computationally intensive than others.)

Based on the database usage scores, the analyzer may determine a system usage score for each database system (e.g., database systems 40, 50 and 90). To determine a system usage score for a particular database system, the analyzer component may be configured to determine an accurate listing of which database resources are hosted by that database system. In some cases, the analyzer component may determine this information from a locally stored representation of the storage configuration of each database system. In other cases, the analyzer may determine such information by polling the individual database systems. Once the analyzer determines a listing of the database resources on the particular database system, the analyzer may determine the sum of the previously generated database usage scores that correspond to such database resources. The result of this summation may be the system usage score for that particular database system.

Analyzer component 310 may be configured to provide the database usage scores and the database system usage scores described above to decider component 320. This process is illustrated as the transfer of derived usage scores from analyzer component 310 to decider component 320.

Note that during operation of service provider system 20, different quantities of workload may be exerted on each database system (e.g., database systems 40, 50 and 90) dependent upon numerous factors including but not limited to the quantity of requests directed to each database resource, the difficulty of those requests (e.g., some requests are more computationally intensive than others), and the data footprint of the request results (e.g., some response messages 210 may be larger than others). Accordingly, in some cases, an imbalance of workload across different database systems may exist. Decider component 320 may be configured to determine which database resources need to be moved in order to diminish this workload imbalance.

TABLE 1

System Usage Scores

| Database System | System Usage Score |
|---|---|
| Database System 40 | 25 |
| Database System 50 | 40 |
| Database System 60 | 1000 |
| Database System 70 | 500 |
| Database System 80 | 20 |
| Database System 90 | 95 |

Table 1 illustrates an example of various system usage scores for six example system databases, such as the database systems described above. The system usage scores may correspond to the quantity of workload historically processed by each database system during a given time period. In the description presented herein, these values will be considered to be representative of the most recent 24 hour period. Other time periods can be used in various embodiments. Accordingly, within the past 24 hours, Table 1 indicates that database system 60 has performed the most work relative to the other enumerated database systems. As described above, the system usage score of a particular database system may be the sum of the database usage scores of the database resources hosted by that particular database. To decrease the system usage score of a first database system and increase the usage score of a second database system, the resource balancer can issue an instruction to move a database resource from the first database system to the second database system. Decider component 320 can utilize this property to generate an action list that specifies a listing of particular database resources that are to be moved among the database systems. The action list may be structured by the decider such that the set of database resource moved decreases the variability of the system usage scores across the multiple databases of the service provider system 20.

The decider 320 may generate the action list according to a variety of techniques. In some embodiments, the decider 320 may generate a ranking of database systems based on system usage scores. Table 2 illustrates such a ranking

TABLE 2

System Usage Score Ranking

| Database System | System Usage Score |
|---|---|
| Database System 60 | 1000 |
| Database System 70 | 500 |
| Database System 90 | 95 |
| Database System 50 | 40 |
| Database System 40 | 25 |
| Database System 80 | 20 |

In some embodiments, decider 320 may structure the action list such that one or more database resources are moved from the highest ranked database system (e.g., database system 60 in this case) to the lowest ranked database system (e.g., database system 60 in this case). Similarly, one or more databases may be moved from the second highest ranked database system to the second lowest ranked database system, and so on.

In some cases, some databases systems may be eliminated as candidates to receive database resources from other database systems. For instance, if a database system has reached a memory storage threshold (e.g., 90% of memory is occupied) or a database threshold (e.g., the system contains more than 1000 database resources), the decider may determine that no additional database resources will be moved to that database system. Other criteria for eliminating database systems from consideration may be utilized in some embodiments.

For a given database system, the decider component 320 may be configured to determine which database to move by ranking the database resources of that database system and selecting the nth highest database resource(s) to move. For instance, in one embodiment, the decider 320 may determine that the database resources with the top score should be moved to another database system. Table 3 illustrates an example ranking of the database resources on database system 60 of Tables 1 and 2.

TABLE 3

Database Usage Score Ranking

| Database System | Database Usage Score |
| --- | --- |
| Database Resource 62b | 970 |
| Database Resource 62c | 10 |
| Database Resource 62a | 20 |

In the example of table 2, decider 320 may determine that the top ranked database resource is to be moved to another database system, such as the lowest ranked database system. In this example, the decider may be configured to generate an entry within the action list that specifies database resource 62b is to be moved from database resource 60 to database resource 80. The decider may be configured to repeat this process for other database systems and generate similar entries in the action list.

Note that in some embodiments, some database resources may be eliminated as candidates to be moved based on various factors. In one example, the decider may eliminate very large databases (e.g., databases that exceed a threshold storage size or threshold item count). In some cases, the resource balancer may generate a projection of the time required to move a given database resource; database resources may be eliminated as candidates to be moved if that projection exceeds a threshold time value. Other criteria for eliminating database resources from consideration may be utilized in some embodiments.

The above-described pair wise movement of database resources from highly ranked database systems to lower ranked database systems is just one example of the techniques that may utilized by the decider component to generate an action list that will result in a diminished workload imbalance across the database systems. In general, the decider 320 may utilize any technique for creating the action list that will reduce the variability (or any other measure of statistical dispersion) of the database system usage scores. In one example, the decider 320 may determine the mean of the usage scores of the various database systems and generate the action list such that the variability of the system usage scores about the mean usage score is decreased. For example, the decider may determine that the average system usage score of Table 1 is 280. In this case, the decider may generate the entries of the action list such that database resources are moved from systems with usage scores above 280 (e.g., database systems 60 and 70) to database systems with usage scores below 280 (e.g., databases systems 40, 50, 80 and 90).

The action list generated by decider 320 may be provided to mover component 330. Mover component 330 may initiate the movement of database resources among the various databases systems (in accordance with the action list) by issuing instructions to the various database systems. For instance, to move a given database resource from a first database system to a second database system, the mover 330 may issue a copy instruction to the first database system to copy the database resource to the second database system. Once this copy is completed, the mover may issue a purge instruction to the first database in order to complete the move by removing (e.g., deleting) the instance of the database resource from the first database. In other embodiments, service provider system 20 may include a replication service configured to replicate database resources across database systems. In these cases, the move instructions generated by the mover 330 may be issued to such a service. Table 4 illustrates one example of the system usage scores of the database systems of Table 1 subsequent to the completion of the move instructions generated by mover 330.

TABLE 4

System Usage Scores (Post Resource Balancing)

| Database System | System Usage Score |
| --- | --- |
| Database System 40 | 240 |
| Database System 50 | 250 |
| Database System 60 | 350 |
| Database System 70 | 310 |
| Database System 80 | 270 |
| Database System 90 | 260 |

As illustrated in Table 4, the resource balancing performed by resource balancer 100 in accordance with the techniques described herein may improve the workload imbalance across multiple database systems. Put in another way, the resource balancer may be configured to decrease the variability of the system usage scores of a set of database systems by moving database resources among the systems according to the techniques described herein.

Note that system usage scores may be based on historical client system activity. For instance, the system usage scores may be based on historical volume of requests received from various clients as well as the destinations of such requests (e.g., which database resources the requests are targeting). In some cases, the request behavior of the client systems may change over time. For instance, a web application relying on a particular database resource of the service provider system may quickly rise in popularity, which may lead to an increased workload for the database systems hosting those database resources. In various embodiments, the resource balancer may periodically (e.g., daily) or aperiodically generate new usage scores based on updated log data and rebalance the database resources based on the updated usage scores.

Example Methods

Figure 4:
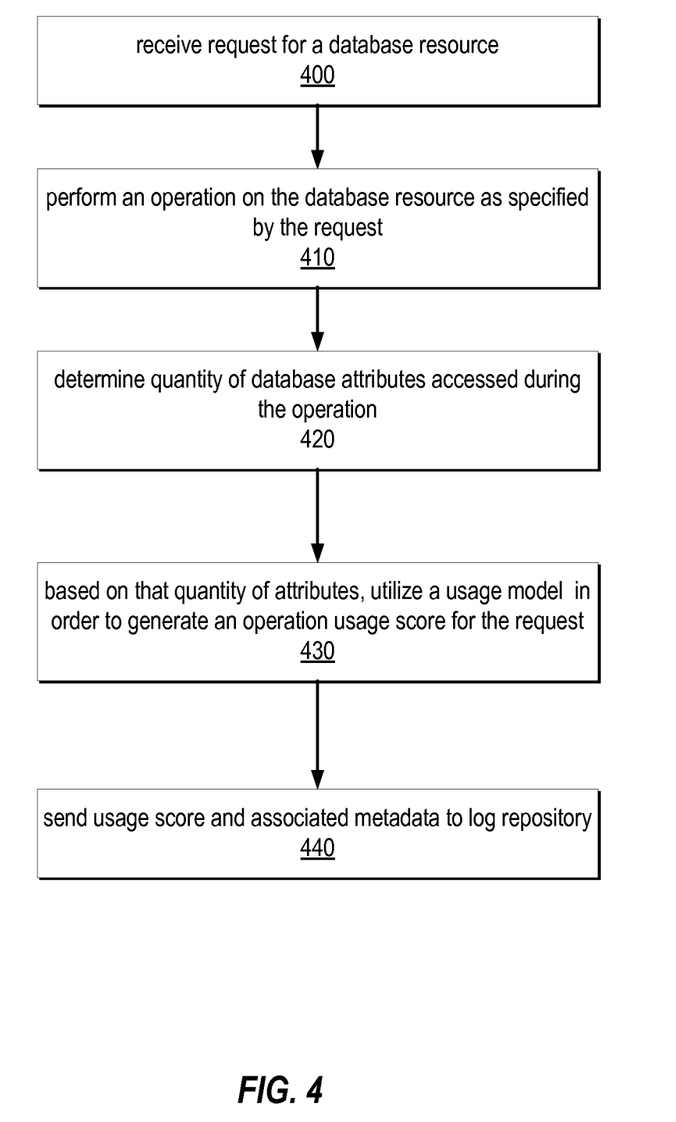
FIG. 4 illustrates a flowchart of an example method for generating operation usage scores for database requests based on a usage model, according to some embodiments.

FIG. 4 illustrates a flowchart of an example method for assigning operation usage scores to individual database requests, according to some embodiments. In various embodiments, database systems 40, 50 and 90 may each be configured to perform the illustrated method in order to assign usage scores to requests.

As illustrated by block 400, the method may include receiving a request for a database resource. Examples of requests may include any of the example requests described above, such as read requests, write requests, and queries. As illustrated by block 410, the method may include performing an operation on the database resource as specified by the request. For instance, if the request specified that a particular record of the database is to be read, the method may include locating the record and returning all attributes of the record. Similarly, if the request specifies on or more attributes that are to be written to the database resources, the method may include locating the respective record(s) and writing the one or more attributes to such record(s). As illustrated by block 420, the method may include determining a quantity of database attributes accessed (e.g., read/written) while performing the operation.

As illustrated by block 430, the method may include applying a usage model in order to generate an operation usage score for the request. In various embodiments, the usage model may depend on the quantity of attributes accessed in regard to block 420. Note that some requests may be more computationally intensive than other requests because the quantity of attributes that are accessed may vary. For instance, a request to read a single specific attribute of an item may be less computationally intensive than reading multiple attributes of that item. The usage model applied may be structured such that requests that result in the accessing of a large number of attributes will be assigned a usage score that is greater than a usage score of a request that results in the accessing of a relatively small number of attributes. In general, the method may apply usage models that result in a direct relationship between the computational intensity of the request and the usage score assigned to the request. One example of such a model is described above with respect to equation 1. The method described herein may utilize this equation and variations thereof in various embodiments. In various embodiments, the usage models performed according to the method may depend on variables other than an attribute quantity. For instance, a write request to write an item with a small data footprint may be less computationally expensive than a write request to write an item with a larger data footprint. In this example, the models described herein could be modified to include a variable for data size. Other modifications are possible and contemplated. As illustrated by block 440, the method may also include providing the generated usage score and relevant metadata to a log repository, such as log repositories 32a-32n described above. The method described above may be repeated for each of multiple received requests.

Figure 5:
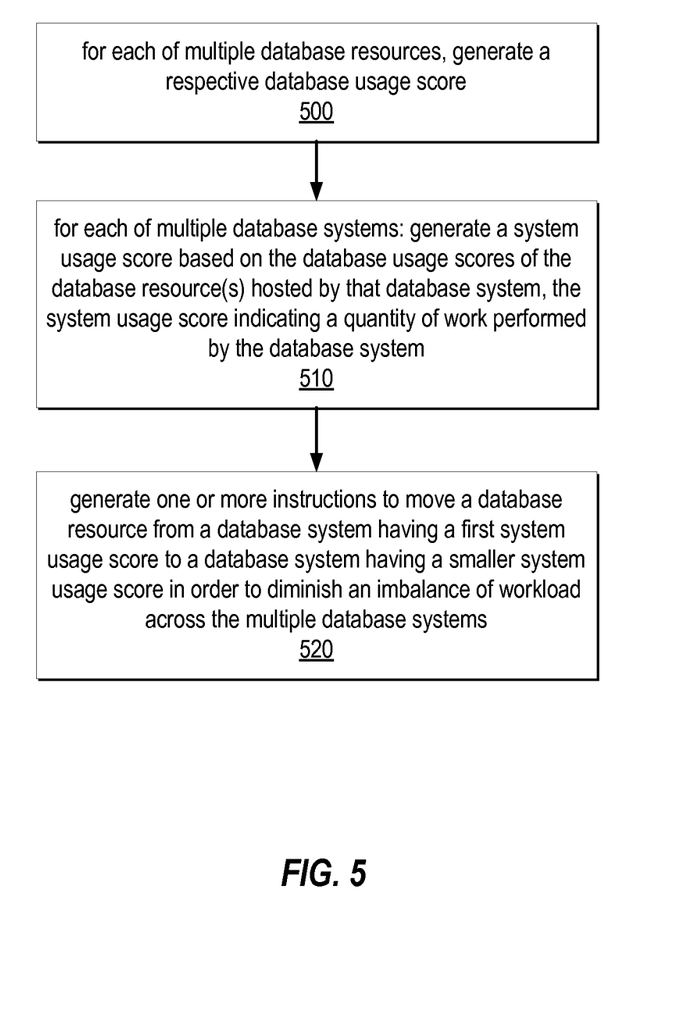
FIG. 5 illustrates a flowchart of an example method for diminishing workload imbalance across multiple database systems, according to some embodiments.

FIG. 5 illustrates a method for diminishing workload imbalance across multiple database systems. In various embodiments, the illustrated method may be performed by resource balancer 100 described above.

As illustrated by block 500, the method may include, for each of multiple database resources, generating a respective database usage score. For instance, the method may include evaluating log data (e.g., log data of the log repository described with respect to block 440 above or FIG. 1 above) to determine operation usage scores that correspond to each database resource and generate the database usage score for that database resource as being the sum of such operation usage scores. In various embodiments, each database usage score of a given database resource may indicate a quantity of work performed by the respective database system to process one or more requests directed to the given database resource.

As illustrated by block 510, the method may include, for each of multiple database systems, generating a system usage score based on the database usage scores of the database resource(s) hosted by that database system. As described above, system usage scores may indicate a quantity of work performed by the database system to process requests directed to all database resources hosted by that database system. In one example, to generate a system usage score for a given database system, the method may include determining the system usage score as being the sum of the database usage scores of the database resources hosted by the given database system.

As illustrated by block 520, the method may also include generating one or more instructions to move a database resource from a database system having a first system usage score to a database system with a smaller system usage score. For example, the method may include any of the techniques described above with respect to generating a ranking of database systems and selectively generating instructions to move certain database resources from higher ranked database systems to lower ranked database systems. In another example, as described above, the mean usage score may be generated and the database resources may be moved among the database systems such that the individual system usage scores more closely resemble the mean system usage score.

Additional Embodiments

In various embodiments, resource balancer 100 may be configured to determine to which database system a given database resource is to be moved based on the time of day during which the given database has been historically accessed and the time of day at which one or more database resources (of the candidate recipient database system) have been historically accessed. In one example, different database resources may be primarily accessed at different periods of a day due to geographical differences in the populations that rely on such database resources. In one example, a database resource that primarily serves populations within North America may be primarily accessed during a first time period; another database resource that primarily serves populations within Asia may be primarily accessed during a second time period that is different than the first period. In one non-limiting example, the resource balancer may structure the action list (FIG. 3) such that these two database resources are located on the same database system. In this way, the resource balancer may maximize the daily capacity of a database system by grouping database resources that exert workloads on the same database system during different time periods. These techniques may be combined with any of the techniques described above.

In some embodiments, instead of the database systems reporting usage scores (and any associated metadata) to the various request routers (e.g., as described with respect to FIG. 2), the data systems may store such usage data locally (e.g., within physical memory or on disk). In these cases, the resource balancer may collect the usage data directly from the database systems. In one non-limiting example, the resource balancer may scan the fleet of database systems for usage data on a daily or hourly basis. The usage data acquired in this manner may be utilized to generate the action list (FIG. 3) utilizing any of the techniques described herein.

In some embodiments, instead of utilizing a resource balancer that is separate from the multiple database systems, the functionality of the resource balancer may be integrated into one or more of the database systems. In one non-limiting example, the functionality of the resource balancer may be integrated into one of such database systems, which may be designated as a control node that controls the movement of database resources throughout the group of database systems. In this configuration, each non-control node may report usage data (e.g., usage scores and any relevant metadata) to the control node, which may employ functionality similar to the resource balancer described herein in order to move one or more database resources among the multiple database systems. In another embodiment, instead of utilizing a single control node, the database systems may communicate respective usage data to each other (e.g., according to a gossip protocol or epidemic protocol). In this embodiment, database systems that are underutilized from a workload perspective may request database resources from database systems that are over utilized.

In some embodiments, the resource balancer described herein may generate the action list (FIG. 3) such that database resources are moved according to one or more algorithms for solving a bin packing problem. In one example of a bin packing problem, objects of different volumes are packed into a finite number of bins of a given capacity in a way that minimizes the quantity of bins utilized. In embodiments where the resource balancer utilizes bin packing algorithms, each database system may be analogous to a bin and the workload capacity of each database system may be analogous to the bin's capacity.

Example Computer System

Various embodiments of a system and method for diminishing workload imbalance across multiple database systems, as described herein, may be executed on one or more computer systems, which may interact with various other devices. Note that any component or action described above with respect to FIGS. 1-5 may be implemented via one or more computer systems configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

Figure 6:
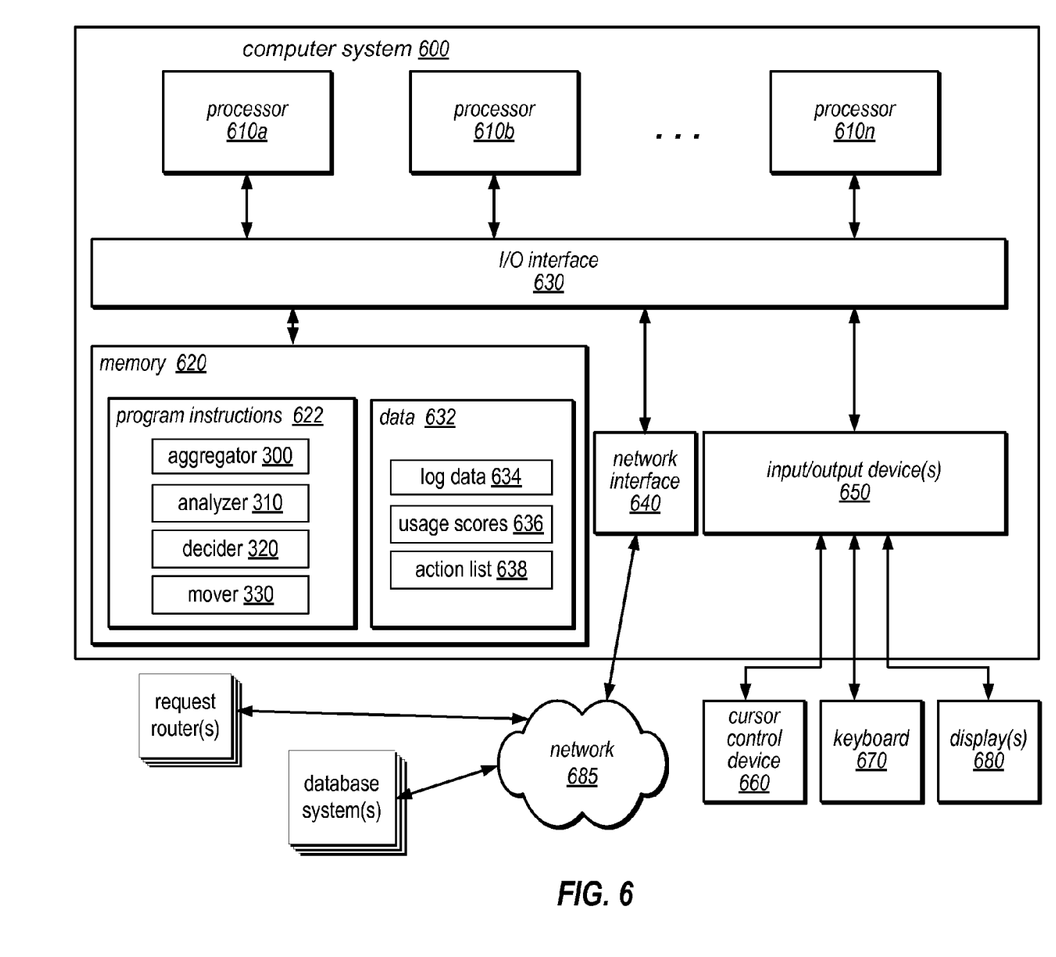
FIG. 6 illustrates a computer system suitable for implementing various elements of the system and method for diminishing workload imbalance across multiple database systems, according to some embodiments.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 implementing the components of resource balancer 100 (configured as described above) are shown stored within system memory 620, as illustrated by aggregator 300, analyzer 310, decider 320, and mover 330. In general, program instructions may be configured to perform any of the functionality described above with respect to resource balancer 100. Additionally, data 632 of memory 620 may in various embodiments store log data 634, usage scores 636 and an action list 638, each of which may be similar to the similarly-named data and information described above with respect to FIG. 2. In some embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 (which may implement resource balancer 100) and other devices (e.g., any of the request routers or database systems described above) attached to a network 685 or between nodes of computer system 600. For instance, instructions to move database resources among the database systems may be transmitted from computer system 600 via network interface 640. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof (similar to network 35 of FIG. 1). In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol. Any of the computer systems, devices, component or elements described herein may communicate via such networks.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 622, which may be configured to implement any element or action described above. In one embodiment, the program instructions may implement the methods described above, such as the methods described above with respect to FIG. 4 and FIG. 5. In other embodiments, different elements and data may be included. Note that data 632 may include any data described above with respect to FIGS. 1-5. Also note that, while the computer system 600 is illustrated as implementing a resource balancer, a similar type of computer system may be utilized to implement any of the elements of FIG. 1 (e.g., client systems, load balancers, request routers, database systems, etc.).

Those skilled in the art will appreciate that computer system 600 is merely illustrative and is not intended to limit the scope of embodiments. In particular, the computer system and devices may include any combination of hardware or software that can perform the indicated functions, including computers (e.g., notebooks, desktops, netbooks, handhelds, etc.), network devices, Internet appliances, set top boxes, PDAs, wireless phones, smartphones, touchscreen devices, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
    one or more computers comprising one or more memories and one or more processors, wherein the one or more memories comprise program instructions executable by the one or more computers to implement a resource balancer configured to:
        for a given multi-tenant database system of a plurality of database systems hosting databases that are each assigned to a particular user entity of different user entities:
            generate a database operational usage score for each individual database of multiple databases hosted by the given multi-tenant database system, wherein:
                each individual database of the multiple databases comprises a particular defined data set to which the given multi-tenant database system restricts access among the different user entities to the particular user entity to which the individual database is assigned, and at least some of the multiple databases are each assigned to a different particular user entity of the different user entities; and
                the database operational usage score for each individual database of the multiple databases is determined based on applying a usage scoring model to one or more requests directed to the individual database, wherein the usage scoring model estimates a quantity of work required to be performed by the given multi-tenant database system to process request types of the one or more requests directed to the individual database of the multiple databases; and
            generate a first system usage score for the given multi-tenant database system based on aggregating the multiple database operational usage scores generated for the multiple databases hosted by the given multi-tenant database system; and
        generate one or more instructions to move at least one of the multiple databases from the given multi-tenant database system having the first system usage score to a second multi-tenant database system having a second system usage score that is less than the first system usage score in order to diminish an imbalance of workload across the plurality of multi-tenant database systems, wherein for each individual database of the at least one of the multiple databases, the second multi-tenant database system restricts access, to the particular defined data set of the individual database, among the different user entities to the particular user entity to which the individual database is assigned.

2. The system of claim 1, wherein the resource balancer is configured to:
    for each individual database of the multiple databases hosted by the given multi-tenant database system:
        receive log information that indicates results of said applying the usage scoring model to the one or more requests directed to the individual database.

3. The system of claim 2, wherein the resource balancer is configured to determine the database operational usage score for each individual database of the multiple databases hosted by the given multi-tenant database system as a summation of the results of applying the usage scoring model to each of the one or more requests directed to the individual database.

4. The system of claim 1, wherein the resource balancer is configured to determine a system usage score, for each multi-tenant database system of the plurality of multi-tenant database systems, as a summation of database operational usage scores for all databases hosted by the multi-tenant database system.

5. The system of claim 1, further comprising said plurality of multi-tenant database systems, wherein each multi-tenant database system of said plurality of database systems is configured to, for each individual database hosted by the multi-tenant database system:
  receive one or more requests to perform an operation on the individual database hosted by the multi-tenant database system; and
  generate a database operational usage score for the individual database based on a quantity of work performed by the multi-tenant database system to process the one or more requests to perform an operation on the individual database.

6. The system of claim 5, wherein each multi-tenant database system of said plurality of database systems is configured to store the database operational usage score for each individual database hosted by the multi-tenant database system as log data accessible to the resource balancer.

7. The system of claim 5, wherein the one or more requests to perform an operation on the individual database hosted by the multi-tenant database system comprise a request to read or write one or more attributes of a database record of the individual database, wherein the multi-tenant database system hosting the individual database is configured to determine said database operational usage score for the individual database based, at least in part, on how many of the one or more attributes of the database record of the individual database are read or written.

8. The system of claim 7, wherein the multi-tenant database system hosting the individual database is configured to determine said database operational usage score for the individual database based, at least in part, on computing a polynomial expression of the usage scoring model that includes a variable quantity representing how many of the one or more attributes of the database record are read or written.

9. The system of claim 5, wherein the one or more requests to perform an operation on the individual database hosted by the multi-tenant database system include a database query, wherein the multi-tenant database system is configured to determine said database operational usage score for the individual database based, at least in part, on how many database records must be evaluated by the multi-tenant database system in order to complete the database query.

10. The system of claim 1, wherein the resource balancer is configured to select a particular database to move, from among the multiple databases hosted by the given multi-tenant database system, in response to determining that the database operational usage score of the particular database is greater than the database operational usage scores of one or more other databases hosted by the given multi-tenant database system.

11. The system of claim 1, wherein the resource balancer is configured to eliminate one or more of the multiple databases hosted by the given multi-tenant database system as candidates to be moved in response to determining that a projection of time required to move the one or more of the multiple databases exceeds a threshold.

12. The system of claim 1, wherein the resource balancer is configured to eliminate one or more of the plurality of multi-tenant database systems as candidates to receive a database in response to one or more of: a determination that a quantity of occupied memory of the one or more of the plurality of multi-tenant database systems exceeds a threshold, or a determination that a quantity of databases currently hosted by the one or more of the plurality of multi-tenant database systems exceeds a threshold.

13. A computer-implemented method, comprising:
  for a given multi-tenant database system of a plurality of database systems hosting databases that are each assigned to a particular user entity of different user entities:
    generating a database operational usage score for each individual database of multiple databases hosted by the given multi-tenant database system, wherein:
      each individual database of the multiple databases comprises a particular defined data set to which the given multi-tenant database system restricts access among the different user entities to the particular user entity to which the individual database is assigned, and at least some of the multiple databases are each assigned to a different particular user entity of the different user entities; and
      the database operational usage score for each individual database of the multiple databases is determined based on applying a usage scoring model to one or more requests directed to the individual database, wherein the usage scoring model estimates a quantity of work required to be performed by the given multi-tenant database system to process request types of the one or more requests directed to the individual database of the multiple databases; and
    generating a first system usage score for the given multi-tenant database system based on aggregating the multiple database operational usage scores generated for the multiple databases hosted by the given multi-tenant database system; and
  generating one or more instructions to move at least one of the multiple databases from the given multi-tenant database system having the first system usage score to a second multi-tenant database system having a second system usage score that is less than the first system usage score in order to diminish an imbalance of workload across the plurality of multi-tenant database systems, wherein for each individual database of the at least one of the multiple databases, the second multi-tenant database system restricts access, to the particular defined data set of the individual database, among the different user entities to the particular user entity to which the individual database is assigned.

14. The computer-implemented method of claim 13, wherein the method comprises, for each individual database of the multiple databases hosted by the given multi-tenant database system: receiving log information that indicates results of said applying the usage scoring model to the one or more requests directed to the individual database.

15. The computer-implemented method of claim 14, wherein the method comprises determining the database operational usage score for each individual database of the multiple databases hosted by the given multi-tenant database system as a summation of the results of applying the usage scoring model to each of the one or more requests directed to the individual database.

16. The computer-implemented method of claim 13, comprising determining a system usage score, for each multi-tenant database system of the plurality of database systems, as a summation of database operational usage scores for all databases hosted by the multi-tenant database system.

17. The computer-implemented method of claim 13, wherein the method comprises, for each individual database hosted by a multi-tenant database system of said plurality of database systems:

receiving one or more requests to perform an operation on the individual database hosted by the multi-tenant database system; and generating a database operational usage score for the individual database based on a quantity of work performed by the multi-tenant database system to process the one or more requests to perform an operation on the individual database.

18. The computer-implemented method of claim 17, wherein the method comprises storing the database operational usage score generated for the individual database hosted by the multi-tenant database system as log data accessible to a resource balancer.

19. The computer-implemented method of claim 17, wherein the one or more requests to perform an operation on the individual database hosted by the multi-tenant database system comprise a request to read or write one or more attributes of a database record of the individual database, wherein the method comprises determining said database operational usage score for the individual database based, at least in part, on how many of the one or more attributes of the database record of the individual database are read or written.

20. The computer-implemented method of claim 19, wherein the method comprises determining said database operational usage score for the individual database based, at least in part, on computing a polynomial expression of the usage scoring model that includes a variable quantity representing how many of the one or more attributes of the database record are read or written.

21. The computer-implemented method of claim 17, wherein the one or more requests to perform an operation on the individual database hosted by the multi-tenant database system include a database query, wherein the method comprises determining said database operational usage score for the individual database based, at least in part, on how many database records must be evaluated by the multi-tenant database system in order to complete the database query.

22. The computer-implemented method of claim 13, wherein the method comprises selecting a particular database to move, from among the multiple databases hosted by the given multi-tenant database system, in response to determining that the database operational usage score of the particular database is greater than the database operational usage scores of one or more other databases hosted by the given multi-tenant database system.

23. The computer-implemented method of claim 13, wherein the method comprises eliminating one or more of the multiple databases hosted by the given multi-tenant database system as candidates to be moved in response to determining that a projection of time required to move the one or more of the multiple databases exceeds a threshold.

24. The computer-implemented method of claim 13, wherein the method comprises eliminating one or more of the plurality of database systems as candidates to receive a database in response to one or more of: a determination that a quantity of occupied memory of the one or more of the plurality of multi-tenant database systems exceeds a threshold, or a determination that a quantity of databases currently hosted by the given one or more of the plurality of multi-tenant database systems exceeds a threshold.

25. A computer-readable storage medium, storing program instructions computer-executable on a computer system to implement a resource balancer configured to:

for a given multi-tenant database system of a plurality of database systems hosting databases that are each assigned to a particular user entity of different user entities:

generate a database operational usage score for each individual database of multiple databases hosted by the given multi-tenant database system, wherein:

each individual database of the multiple databases comprises a particular defined data set to which the given multi-tenant database system restricts access among the different user entities to the particular user entity to which the individual database is assigned, and at least some of the multiple databases are each assigned to a different particular user entity of the different user entities; and the database operational usage score for each individual database of the multiple databases is determined based on applying a usage scoring model to one or more requests directed to the individual database, wherein the usage scoring model estimates a quantity of work required to be performed by the given multi-tenant database system to process request types of the one or more requests directed to the individual database of the multiple databases; and generate a first system usage score for the given multi-tenant database system based on aggregating the multiple database operational usage scores generated for the multiple databases hosted by the given multi-tenant database system; and generate one or more instructions to move at least one of the multiple databases from the given multi-tenant database system having the first system usage score to a second multi-tenant database system having a second system usage score that is less than the first system usage score in order to diminish an imbalance of workload across the plurality of multi-tenant database systems, wherein for each individual database of the at least one of the multiple databases, the second multi-tenant database system restricts access, to the particular defined data set of the individual database, among the different user entities to the particular user entity to which the individual database is assigned.

26. The computer-readable storage medium of claim 25, wherein the resource balancer is configured to:

for each individual database of the multiple databases hosted by the given multi-tenant database system:

receive log information that indicates results of said applying the usage scoring model to the one or more requests directed to the individual database.

27. The computer-readable storage medium of claim 26, wherein the resource balancer is configured to determine the database operational usage score for each individual database of the multiple databases hosted by the given multi-tenant database system as a summation of the results of applying the usage scoring model to each of the one or more requests directed to the individual database.

28. The computer-readable storage medium of claim 25, wherein the resource balancer is configured to determine a system usage score, for each multi-tenant database system of the plurality of database systems, as a summation of database operational usage scores for all databases hosted by the multi-tenant database system.

29. The computer-readable storage medium of claim 25, wherein the program instructions are configured to, for each individual database hosted by a multi-tenant database system of said plurality of database systems:

receive one or more requests to perform an operation on the individual database hosted by the multi-tenant database system; and generate a database operational usage score for the individual database based on a quantity of work performed by the multi-tenant database system to process the one or more requests to perform an operation on the individual database.

30. The computer-readable storage medium of claim 29, wherein the program instructions are configured to store the database operational usage score for each individual database hosted by the multi-tenant database system as log data accessible to the resource balancer.

31. The computer-readable storage medium of claim 29, wherein the one or more requests to perform an operation on the individual database hosted by the multi-tenant database system comprise a request to read or write one or more attributes of a database record of the individual database, wherein the program instructions are configured to determine said database operational usage score for the individual database based, at least in part, on how many of the one or more attributes of the database record of the individual database are read or written.

32. The computer-readable storage medium of claim 31, wherein the program instructions are configured to determine said database operational usage score for the individual database based, at least in part, on computing a polynomial expression of the usage scoring model that includes a variable quantity representing how many of the one or more attributes of the database record are read or written.

33. The computer-readable storage medium of claim 29, wherein the one or more requests to perform an operation on the individual database hosted by the multi-tenant database system include a database query, wherein the program instructions are configured to determine said database operational usage score for the individual database based, at least in part, on how many database records must be evaluated by the multi-tenant database system in order to complete the database query.

34. The computer-readable storage medium of claim 25, wherein the resource balancer is configured to select a particular database to move, from among the multiple databases hosted by the given multi-tenant database system, in response to determining that the database operational usage score of the particular database is greater than the database operational usage scores of one or more other databases hosted by the given multi-tenant database system.

35. The computer-readable storage medium of claim 25, wherein the resource balancer is configured to eliminate one or more of the multiple databases hosted by the given multi-tenant database system as candidates to be moved in response to determining that a projection of time required to move the one or more of the multiple databases exceeds a threshold.

36. The computer-readable storage medium of claim 25, wherein the resource balancer is configured to eliminate one or more of the plurality of database systems as candidates to receive a database in response to one or more of: a determination that a quantity of occupied memory of the one or more of the plurality of database systems exceeds a threshold, or a determination that a quantity of databases currently hosted by the one or more of the plurality of database systems exceeds a threshold.

* * * * *